United States Patent [19]

Lesko et al.

[11] Patent Number: 5,045,325
[45] Date of Patent: Sep. 3, 1991

[54] CONTINUOUS PRODUCTION OF CHEWING GUM USING COROTATING TWIN SCREW EXTRUDER

[75] Inventors: Albert J. Lesko, Wallington; Marc Degady, Budd Lake, both of N.J.

[73] Assignee: Warner-Lambert Company, Morris Plains, N.J.

[21] Appl. No.: 589,226

[22] Filed: Sep. 26, 1990

[51] Int. Cl.$^5$ ............................................. A23G 3/30
[52] U.S. Cl. ........................................ 426/5; 426/516; 366/83; 366/84; 366/85; 366/86
[58] Field of Search ................... 426/5, 3, 4, 6, 516; 366/83, 84, 85, 86

[56] References Cited

U.S. PATENT DOCUMENTS

| | | | |
|---|---|---|---|
| 947,635 | 1/1910 | Darling | 366/83 |
| 1,700,303 | 1/1929 | Bauer | 426/5 |
| 1,852,005 | 4/1932 | Garbutt | 426/5 |
| 1,953,295 | 4/1934 | Garbutt | 426/5 |
| 2,156,810 | 5/1939 | Garbutt | 426/5 |
| 2,256,190 | 9/1941 | Bowman | 426/5 |
| 3,455,755 | 7/1969 | Phillips | 426/5 |
| 3,644,169 | 2/1972 | Phillips | 426/5 |
| 3,854,627 | 12/1974 | Coons | 222/1 |
| 3,857,965 | 12/1974 | Ream | 426/3 |
| 4,555,407 | 11/1985 | Kramer et al. | 426/5 |
| 4,579,738 | 4/1986 | Cheruhuri et al. | 425/5 |
| 4,737,366 | 4/1988 | Gergely et al. | 426/5 |
| 4,940,594 | 7/1990 | Van Alstine | 426/5 |
| 4,975,228 | 12/1990 | Hager et al. | 426/5 |

OTHER PUBLICATIONS

Renz, K. H., "New Taste Sensations for Chewing Gum Fans", Food Marketing and Technology, pp. 6–11, Mar. 1988.

Baker Perkins, "Food Extrusion Systems" Promotional Brochure, Jun. 1984.

Primary Examiner—Jeanette Hunter
Attorney, Agent, or Firm—Craig M. Bell

[57] ABSTRACT

A method for continuous production of a chewing gum slab in the absence of separate cooling is disclosed. The method includes introducing chewing gum ingredients and gum base into an extruder and extrusion mixing the ingredients with the gum base over a distance to provide a substantially homogeneous chewing gum mass. The mass is also cooled over the distance so that the chewing gum slab is provided which is suitable for rolling and scoring is extruding into a rope without a separate cooling step.

12 Claims, 1 Drawing Sheet

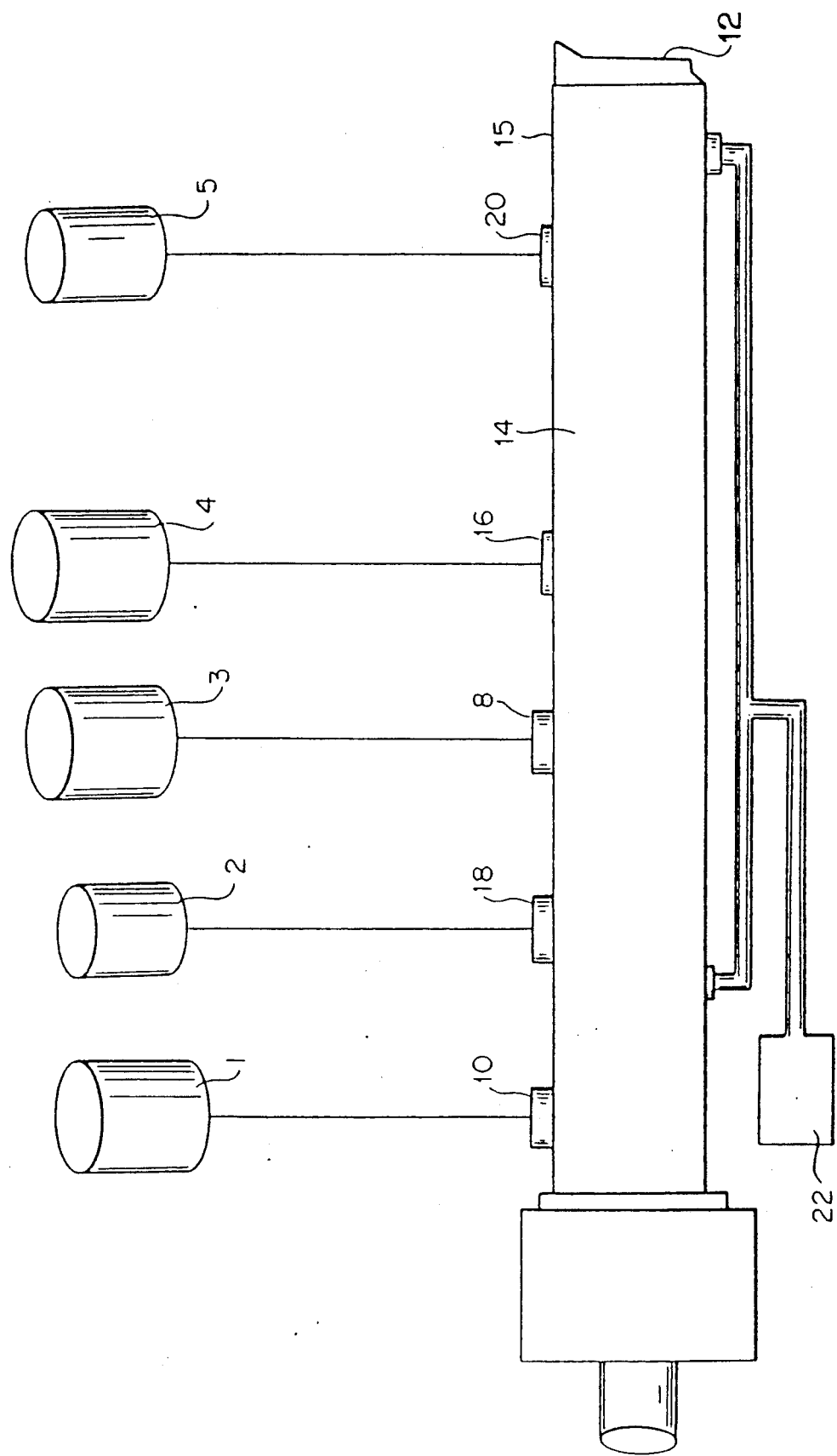

CONTINUOUS PRODUCTION OF CHEWING GUM USING COROTATING TWIN SCREW EXTRUDER

BACKGROUND OF THE INVENTION

The present invention relates to methods for producing chewing gums. In particular, the invention relates to a method for continuous chewing gum production using extrusion apparatus.

The batch method of producing chewing gums has long been considered the standard for producing chewing gums on a commercial scale. Such methods, however, tend to be labor intensive and produce chewing gums of varying consistency. The batch process typically requires using large kettles for the extensive mixing and kneading of a gum base and plasticizers into a viscous melt. Thereafter, softeners and bulking agents such as sugars or sugar alcohols are added to the molten mass with stirring. Later, flavorings, such as flavor oils and/or spray-dried flavors, and sweeteners are added while mixing is continued until a homogenous mass is achieved. The chewing gum mass is thereafter cooled and then later rolled, scored and wrapped into the final product. The above described method often required multiple mixing steps and transferral of the gum mass from various production apparatus and work areas until the final product was completed. Further, since the batch process was unmechanized, the various mixing and kneading steps required the continuous input of the chewing gum artisan to determine when ingredients were to be added to the batch. Since the timing of the ingredient additions to the molten mass was subjectively based, the final products often varied in texture and/or flavor from batch to batch.

Over the years, various attempts by the industry to replace the batch process for the bulk manufacture of chewing gums have been made. U.S. Pat. Nos. 1,852,005 and 1,953,295 disclose early continuous production methods and apparatus for producing chewing gum strips. These initial attempts, however, had several shortcomings. For example, these patents disclose methods using a single entry port for the ingredients and subjecting all of the ingredients to plasticizing temperatures throughout an extrusion process before allowing a gum slab to exit. While providing continuous output of a chewing gum slab, these methods proved to be unacceptable. Continuous heating of the gum ingredients and the single entry port caused opportunities for delicate ingredients such as flavor oils to "flash off" or degrade due to the prolonged exposure to high temperatures and considerable pressure throughout the extrusion process.

U.S. Pat. No. 3,455,755 discloses a method and apparatus for continuously casting slabs of chewing gums and for accordion-like pleating and stacking of the slab. This method, like the earlier methods described, suffers from using a single entry port for introducing the gum ingredients. The extended period of heat exposure and pressure build-up which can detract from the organoleptic qualities of the resulting gum remained. In addition, the cooling of the chewing gum slabs is accomplished by depositing the molten chewing gum material on a conveyer belt maintained under water for the greater part of its length. The ability to precisely locate crucial points for the addition of temperature sensitive materials such as flavor oils is not disclosed. U.S. Pat. No. 3,644,169 has a similar disclosure.

More recently, U.S. Pat. No. 4,555,407 discloses a method for continuously forming wide, thin chewing gum slabs using a twin screw extruder. According to this method, a chewing gum paste is formed by continuously introducing into a first feed port of an extruder pelletized gum base, corn syrup, a portion of granulated sugar, plasticizer and coloring ingredients. The remaining sugar is then continuously introduced into a second port just past the first feed port. Flavoring ingredients are not added until at least about three-quarters of the length of the extruder from the feed end to minimize the amount of time the flavoring ingredients are exposed to the heat of the extruder. After exiting from the extruder through a coat hanger-type die, the gum paste slab is quickly cooled before being passed through calendar rolls to adjust the thickness of the gum paste slab. Thus, while providing for selective and timed addition of some ingredients, the extensive cooling of the gum paste slab remained outside of the extruder as shown in prior art methods. Such cooling, however, can be uneven and variations in the cooling rate are known to result in adverse textural qualities of the final product.

Accordingly, none of the related art describes a method for the continuous preparation of a chewing gum slab from chewing gum ingredients in the absence of requiring a separate cooling step. A need, therefore, exists for a method of continuously producing chewing gum slabs which do not require a separate cooling step once the slab has exited from the extruder.

It is, therefore, an object of the present invention to provide an improved method for the continuous preparation of chewing gum slabs for producing a chewing gum product in the absence of requiring a separate cooling step after the gum slab has exited the extruder. Other objects will be apparent from the disclosure set forth herein.

SUMMARY OF THE INVENTION

In accordance with the present invention, there is provided a method for continuous production of a chewing gum product from chewing gum ingredients in the absence of a required separate cooling. The method includes introducing chewing gum ingredients and gum base into an extruder at a distance from each other sufficient to prevent unwanted back flow of the gum base which creates unwanted hot spots and discontinuities in the chewing gum product. In particular, the method provides for introducing the chewing gum ingredients into the extruder through the entry port furthest from the extruder exit port and extruding the ingredients with preferably a liquid gum base in the barrel of the extruder along with, if desired, a coloring agent. Depending upon the desired final product, sweeteners and texturizers such as corn syrup may be added prior to or after the gum base has been introduced in the extrusion process. A flavor may also be added, preferably close to the exit port of the extruder barrel. The above ingredients are then extrusion mixed over a distance to provide a substantially homogeneous chewing gum mass. The chewing gum mass is also cooled over this distance to provide a chewing gum slab which can be rolled and scored or further extruded into a rope for cutting and wrapping in the absence of separate cooling.

Key to the method of the present invention, however, is the combination of the ability to control the temperature drop of the gum mass in the extruder barrel and the length of the barrel itself. The combination of travel time during extrusion while exposing the ingredients to cooler barrel temperatures allows a sufficient temperature drop so that the extruded gum exits the extruder barrel ready for rolling, scoring and wrapping.

Additionally, for the purposes of providing varied chewing gum products, entry ports for introducing, for example, plasticizers, texturizers, sweeteners, and the like can be found at various locations along the barrel of the extruder.

As a result of the present invention, an improved method for continuously preparing a chewing gum slab for producing a gum product is provided. By selectively adding the more sensitive ingredients at precise locations along the extrusion process, the integrity of the sensitive ingredients is preserved. Further, by incorporating the flavor ingredients during movement of the chewing gum ingredients through cooler zones of the extruder, the flavor ingredients are less likely to "flash" or degrade and residence time of the flavors within the extruder barrel is minimized. Unlike other methods using extrusion apparatus for mixing chewing gum ingredients, the current method does not contain a reverse mixing element or a plug. Rather, a one directional flow of the ingredients is used so that excessive heat generation and pressure build-up are conspicuously absent from this method. By removing the reverse action of the mixing and kneading elements, it has been found that the integrity of the resulting chewing gum products is more likely to be maintained and that ingredient breakdown is significantly reduced.

This economical and time-saving method uniquely provides continuous production of a chewing gum slab exiting the extruder at temperatures not requiring further, separate cooling prior to rolling and scoring operations. In addition, the method of the present invention allows the artisan to add chewing gum ingredients at varied locations along the extrusion process rather than all at the start.

Further, by providing a temperature drop and cooling of the extruded ingredients while in the extruder barrel, the present method allows for the protective introduction of chewing gum ingredients which are heat labile or pressure sensitive. For example, flavors and/or flavor oils may now be incorporated into chewing gums at temperatures below those typically maintained during extrusion so that all flavor notes and organoleptic nuances are preserved.

For a better understanding of the present invention, together with other and further objects, reference is made to the drawing and to the following detailed description, and its scope will be pointed out in the appended claims.

BRIEF DESCRIPTION OF THE DRAWINGS

FIG. 1 is a schematic representation of a system for carrying out the present invention.

DETAILED DESCRIPTION OF THE INVENTION

In accordance with the present invention, a method for continuous preparation of a chewing gum slab utilizing extrusion apparatus in the absence of required separate cooling is disclosed. The method includes introducing chewing gum ingredients and a gum base into an extruder which is externally cooled at least between the exit port of the extruder and the entry port designated for the introduction of gum base. The extruder also has discrete entry ports for introducing the ingredients along a multiple zoned area of the extruder barrel. The distance between the entry ports for introducing the gum base and chewing gum ingredients is sufficient to prevent unwanted back-flow of the gum base to avoid creating unwanted hot spots and/or discontinuities in the gum product. The chewing gum ingredients are extrusion mixed with a gum base over a distance to form a substantially homogeneous chewing gum mass by intimate mixing. The chewing gum mass is cooled by a combination of externally applied cooling and travel time while still in the extruder barrel prior to exiting the extruder as a chewing gum product suitable for rolling and scoring or rope forming without a separate cooling step.

In a preferred embodiment, the method also includes introducing a member of the group consisting of colorants, sweeteners, plasticizers, texturizers, bulking agents, flavors and mixtures thereof at preselected sites along the barrel of the extruder to provide varied chewing gum products.

The extruder environment in which the method of the present invention may be carried out preferably includes a multiple zoned barrel configuration, with each zone having separate temperature controls to maintain and monitor the temperature of the throughput. In addition, the barrel is preferably configured to include external cooling along its entire length. Cooling may be accomplished using readily available technology such as refrigeration or chilled water jackets surrounding the barrel. Depending upon throughput, the external barrel temperature should be maintained at from about $-15°$ C. to about $10°$ C. throughout all zones so as to counteract the natural heat build-up caused by extrusion-type mixing and provide the necessary temperature drop of the chewing gum product before exiting the extruder barrel. In addition, the barrel can be heated or cooled in selected zones to maintain flowability, increase or decrease viscosity and maintain the integrity of the chewing gum mix.

The length of the extruder barrel is calculated to provide sufficient travel time of the extruded chewing gum ingredients through the externally cooled extruder barrel. This combination of barrel length and travel time of the throughput allows the chewing gum slab to exit the extruder without the need for subsequent separate cooling. The gum slab exits the extruder at a temperature of from about $40°$ C. to about $51°$ C. at a throughput ranging from about 100 to about 4,000 kg/hr, depending upon the length to diameter (L/D) ratio of the extruder barrel. The continuous blanket of output may then be directed to a take-off belt and directed to a rolling and scoring machine. The gum should be extruded at a rate providing an uninterrupted gum blanket to the rollers of a rolling and scoring machine and pass through a duster. The gum may then be passed through a series of sizing rollers to reach a final desired width.

The amount of temperature drop of the chewing gum base while mixing with the powdered ingredients is, therefore, carefully calculated. The relationship between the length of the barrel and cooling time is best expressed in terms of the barrel diameter of the extruder. In a preferred embodiment, the gum base entry port is located a distance equal to from about four to about seven times the diameter of the extruder barrel from the entry port designated for the entry of the powdered ingredients. Shortening the distance between the entry port for the gum base to that of the powdered ingredients increases the pressure and temperature on the chewing gum ingredients unnecessarily. Lengthening the distance between the two entry ports decreases the likelihood that sufficient mixing of the ingredients will occur as product throughput is increased to levels approaching optimum output i.e., about 550 kg/hr using an 80 millimeter diameter barrel or about 4,000 kg/hr using a 160 mm diameter barrel.

The length of time that the gum base and powdered ingredients are mixed in the barrel of the extruder is also dependent upon the screw rpm and pumping rate of the ingredients. The length of the barrel during which full mixing of the ingredient occurs has also been found to effect the need for further cooling of the chewing gum. Since the barrel is cooled externally, the chewing gum product is actually cooled for the length of the barrel as it works its way through to the exit port. It has been found that the minimum travel time of the chewing gum ingredients after thorough mixing is a distance equal to about eighteen times the diameter of the extruder barrel. At this minimum length, the chewing gum will exit the extruder at a temperature sufficient to allow rolling and scoring or extruding into a rope without further cooling of the chewing gum. Longer distances are possible, however, the temperature drop must not be too great since the chewing gum may begin to back up at the exit port due to the higher viscosity which gums have at cooler temperatures, i.e. less than 40° C.

A preferred multiple-zoned extruder useful in carrying out the method of the present invention has two intermeshing screw shafts composed of individual conveying and kneading elements of different pitches and lengths. Each intermeshing screw rotates in the same direction in the barrel with a figure eight shape bore. The paddle elements of the extrusion apparatus can be set at various angles to provide mixing of the various chewing gum ingredients without generating high pressures which can damage the chewing gum ingredients.

The method of the present invention also avoids the inclusion of extrusion apparatus which reverse the direction of the barrel screw to mix and knead the chewing gum ingredients. By conveying the ingredients through the extruder in a one-directional flow toward the exit port, increases in barrel temperature and barrel pressure are minimized.

The top of the extruder barrel useful in carrying out the method of the present invention contains numerous entry ports for introducing the various chewing gum ingredients. Those ports not being used for introducing the chewing gum ingredients are sealed to provide a closed system. Thermocouples may also be included for monitoring internal temperatures. The order of introduction of the ingredients aside from the powdered chewing gum ingredients is a matter of choice for the artisan. The final chewing gum products can be custom tailored by moving the placement of the entry ports of the various chewing gum ingredients. For example, by moving the sweetener closer to the entry port designated for the gum base, the sweetener will be less pronounced in the initial chew. On the other hand, moving the sweetener further away from the introduction of the gum base and in the direction of the exit port results in a chewing gum having initial burst of sweetness.

Typically, chewing gums contain flavors, a gum base, bulking agents such as sugar or sugar alcohols, colorants, plasticizers, texturizers, sweeteners, and the like.

Gum bases suitable for carrying out the method of the present invention may be selected from a wide variety of commercially available products, but in a preferred embodiment, a molten gum base is used, and as such must be able to withstand periods of heated liquification at temperatures approaching 100° C. In carrying out this preferred method, gum base is heated and held in a tank and metered into the extruder barrel during extrusion with the other chewing gum ingredients.

The gum base typically contains an elastomer component, a resin component, an elastomer solvent, plasticizers, mineral adjuvants, as well as conventional additives such as antioxidants, preservatives, colorants and the like.

In particular, the elastomer component of the gum base of the present invention can be selected from synthetic elastomers such as styrene-butadiene copolymers (butyl rubber), natural rubber (polyisoprene), as well as masticatory substances of natural origin, such as rubber latex solids, chicle, crown gum, nisparo, rosidinha, jelutong, pendare, perillo, niger gutta, tunu, etc. Mixtures of these materials are also useful.

The resin component, on the other hand, can be selected from polyvinyl butyl ester, copolymers of vinyl esters and vinyl ethers, polyethylene, ethylene-vinyl acetate copolymers, vinyl acetate-vinyl alcohol copolymers, vinyl acetate vinyl laurate copolymers, and in particular high molecular weight polyvinyl acetate, which is at least about 20,000 MWU.

The gum base usually includes an elastomer solvent, which may be selected from terpene resins, such as polymers of alpha-pinene or beta-pinene; rosin derivatives including hydrogenated or partially hydrogenated derivatives, such as the glycerol ester of polymerized rosin, alcohol esters of rosin, such as the glycerol ester of hydrogenated rosin, the pentaerythritol ester of hydrogenated rosin, the glycerol ester of rosin and mixtures thereof.

The gum base may include an oleaginous plasticizer, such as hydrogenated vegetable oil, cocoa butter, natural waxes, petroleum waxes such as the polyethylene waxes, paraffin waxes, and microcrystalline waxes with melting points higher than 80° C., or mixtures thereof. These materials may be utilized generally as softeners.

The gum base may include mineral adjuvants such as calcium carbonate, magnesium carbonate, alumina, aluminum hydroxide, aluminum silicate, talc, tricalcium phosphate and the like; as well as mixtures thereof. These mineral adjuvants may also serve as fillers and texturizing agents.

Fatty acids may also be included, to serve as softeners, and suitable fatty acids would include, for example, stearic acid, palmitic acid, oleic acid, and mixtures thereof. The gum bases also frequently include emulsifiers, particularly those that would be compatible with the vinyl polymer, if included in the base. Particularly, lecithin, glycerol monostearate, fatty acid monoglycerides, diglycerides and triglycerides, glycerol triacetate, propylene glycol monostearate and mixtures thereof may be used.

The gum base composition may also include conventional additives such as antioxidants, preservatives, colorants and the like. For example, titanium dioxide may be utilized as a colorant, and an antioxidant such as butylated hydroxytoluene, butylated hydroxyanisole, and mixtures thereof, may also be included.

Naturally, the gum bases may be prepared for a variety of products, including conventional gums and bubble gums, and the method of the present invention is not limited to utilizing a specific gum base formulation.

The gum base is held in a holding tank 3 schematically represented in FIG. 1 and metered into the barrel of the extruder. The holding tank may be enclosed in a steam jacketed enclosure to maintain the gum base at an elevated temperature of, for example, between about 65° to about 93° C. The metering of the gum base into the extruder barrel is dependent upon several factors. For example, the revolutions per minute (rpm) of the co-rotating extruder screws is set at a predetermined rate. The gum base must be metered in such a way so that the product throughput (measured in kg/hr) is maintained. For purposes of illustration, the gum base would be metered in at about 98 kg/hr when the screws are rotating at 150 revolutions per minute. It should be noted, however, that the introduction of the gum base as well as the other ingredients may be varied depending upon the extruder, the particular ingredients included in the chewing gum product and/or their proportions or the particular chewing gum sought. Introduction of the ingredients is controlled by varying the feed rate.

As stated above, chewing gums made in accordance with the present invention also contain a bulking agent. Such bulking agents may include sugar or sugar alcohols commonly found in conventional chewing gum products. Examples of such sugar alcohols include sorbitol, mannitol, xylitol and mixtures thereof. The bulking agents are introduced into the extruder barrel through the entry port furthest from the extruder exit port and preferably in the powdered form. The bulking agents may be conveyed into the extruder barrel using a metering system such as that available from K-tron.

The colorants may be selected from any of the numerous dyes suitable for food, drug and cosmetic applications, and are well known in the art. The materials acceptable are typically referred to as FD&C dyes and a full recitation of these colorants and their corresponding chemical structures may be found in the *Kirk-Othmer Encyclopedia of Chemical Technology*, Vol. 5, pages 857-884, which is incorporated herein by reference. The colorant may be metered in to the barrel of the extruder at any point in the extrusion process according to the preference of the artisan. The colorants may be water soluble or dispersed in a liquid and metered into the extruder barrel.

Likewise, sweeteners may be metered into the extruder barrel at different points along extrusion process according to preference. The further away from the exit port of the extruder barrel, however, the less pronounced the sweetener will be initially in the chewing gum due to the more intimate embedding of the sweetener in the chewing gum base and powdered mixture ingredients.

The sweeteners may be selected from the following non-limiting list: sugars such as sucrose, glucose or corn syrup, dextrose, invert sugar, fructose, and mixtures thereof, saccharin and its various salts such as the sodium or calcium salt; the dipeptide sweeteners such as aspartame, dihydroxguaiacol compounds, glycyrrhizin; *Stevia rebaudiana* (Stevioside); talin, dihydrochalcone, chloro derivatives of sucrose, cyclamic acid and its various salts such as the sodium salt, sucralose, dihydroflavinol; hydroxyguiacol esters; L-amino dicarboxylic acid gemdiamines; L-aminodicarboxylic acid aminoalkenoic acid ester amides; and sugar alcohols such as sorbitol, sorbitol syrup, mannitol, xylitol, and the like.

Also contemplated as an additional sweetener is the non-fermentable sugar substitute (hydrogenated starch hydrolysate) which is described in U.S. Reissue Pat. No. 26,959. Also contemplated is the synthetic sweetener 3,6-dihydro-6-methyl-1-1,2,3-oxathiazin-4-one-2,2-dioxide, particularly the potassium (acesulfame-K) sodium and calcium salts thereof as described in German Patent No. 2,001,017.7.

The sweeteners, if not already in liquid form, are typically dissolved or dispersed in a liquid and metered into the extruder barrel for mixture into the final chewing gum product.

Flavors may also be included in chewing gum products made in accordance with the method of the present invention. Such flavorings are well known in the chewing gum art and may be chosen from natural and synthetic flavoring liquids such as synthetic flavor oils and flavoring aromatics and/or oils; and/or liquids, oleoresin or extracts derived from plants, leaves, flowers, fruits, etc., and combinations thereof. For example, the flavoring can be selected from spearmint oil, cinnamon oil, oil of wintergreen (methyl salicylate) and peppermint oil, clove oil, bay oil, oil of nutmeg, allspice, oil of sage, mace, oil of bitter almonds, and cassia oil. Also useful are artificial, natural or synthetic flavors such as vanilla and citrus oils including lemon, orange, grape, lime and grapefruit and fruit essences including apple, pear, peach, grape, strawberry, raspberry, cherry, plum, pineapple, apricot, etc.

Other useful flavorings include aldehydes and esters such as benzaldehyde (cherry, almond), citral, i.e., alphacitral (lemon, lime), neral, i.e., beta-citral (lemon, lime), aldehyde C-8 (citrus fruits), aldehyde C-9 (citrus fruits), aldehyde C-12 (citrus fruits), tolyl aldehyde (cherry, almond), 2,6-dimethyl-octanal (green fruit), and 2-dodecenal (citrus, mandarin), mixtures thereof and the like.

The flavors may also be included as spray dried flavors, flavor-resin encapsulations and/or powdered flavors.

Plasticizers useful in the chewing gums include, for example, glycerin, lanolin, stearic acid, sodium stearate, potassium stearate, glyceryl triacetate, hydrogenated vegetable oil and the like. In addition to its sweetening properties, corn syrup may be included in the chewing gums as a texturizer.

For illustrative purposes, the method of the present invention will now be described using a representative chewing gum formula and the APV Baker Model No. MPF-80D co-rotating twin screw extruder are used.

A suitable formula for chewing gum capable of being produced according to the method of the present invention is set forth below in Table I.

TABLE I

| Representative Chewing Gum Formula | |
|---|---|
| Ingredients | Parts by Weight |
| Gum Base | 28.071 |
| Sugar | 56.979 |
| Texturizer - Sweetener (corn syrup) | 12.335 |
| Color (dispersed in glycerin) | 1.044* |
| Flavor | 1.571 |
| | 100.000 |

Actual weight of color equals 0.115, actual weight of glycerin 0.929.

Referring now to FIG. 1, which shows schematically the addition points for the various ingredients in the extrusion apparatus, the method of the present invention is disclosed in detail, below. The gum base is heated and maintained at a temperature of between about 80° to about 95° C. in a holding tank 3. The gum base is metered into the barrel portion 14 of the extruder 15 through an entry port 8. The sugar is held in a vessel 1 and conveyed to the entry port 10 of the extruder barrel furthest from the extruder exit port 12. The texturizer and sweetener, in this case, corn syrup, is held in a holding tank 4 at a temperature of from about 29° to about 32° C. and metered into the extruder barrel 14 via an entry port 16. The color, in this case, dispersed in a glycerin solution is also placed into a holding tank 2 and metered into the extruder barrel via an entry port 18. The flavor is also held in a tank 5 connected to the barrel of the extruder. Preferably, the flavor is introduced relatively late in the extrusion process via entry port 20 so that degradation is minimized and all flavor notes and nuances are preserved.

The sugar portion of the representative sample chewing gum is metered into the extruder about 11 centimeters from the beginning of the extruder barrel. The color and any softener, if desired, may be injected into the barrel at any feed port position. The gum base can be injected between about the 20 to about the 102 centimeter feed position depending upon the desired exit temperature. Next, the corn syrup may be added between the 20 to 172 centimeter feed positions. Finally, the flavor may be injected at any feed port position depending upon the finished texture of the gum and flavor release desired.

At the outset, all valves which direct the flow of gum ingredients to the extruder are opened. The extruder twin screws are set at a moderate pace, for example 70 rpm. The pumps for all the liquid raw materials and sugar are set for 300 kg/hr product throughput. In less than a minute after start-up, finished product will begin to appear at the discharge end. All of the extruder internal zones are cooled by a cooling system 22 to a temperature of between about 0° F. to about 50° F. depending upon the gum formula. The temperature and delivery rate of the raw materials, screw rpm and barrel temperature are maintained during this stage of the run to achieve a steady state, usually reached in about a half hour. Once at steady state, it is possible to increase the throughput of the machine up to 500 kg/hr at 180 rpm screw speed. At this point, the blanket of gum coming out of the extruder die is placed on to a take off belt for removal to rolling and scoring operations without requiring further cooling.

When it is desired to stop the continuous process, the rpm's of the screws are slowly reduced and all of the pumping apparatus are purged.

While there have been described what are presently believed to be the preferred embodiments of the invention, those skilled in the art will realize that changes and modifications may be made thereto without departing the spirit of the invention, and it is intended to claim all such changes and modifications as fall within the true scope of the invention.

What is claimed is:

1. A method for continuous preparation of a chewing gum slab from chewing gum ingredients and a liquid gum base in the absence of required separate cooling of said gum slab, said method comprising:
   (a) introducing chewing gum ingredients selected from the group consisting of colorants, plasticizers, texturizers, bulking agents, sweeteners, flavors and mixtures thereof and heated liquid gum base into an extruder at a distance from each sufficient to prevent back flow of said liquid gum base and thereby preventing unwanted hot spots and discontinuities in the final gum slab;
   (b) extrusion mixing said liquid gum base and said chewing gum ingredients while cooling in said extruder over a distance to provide a substantially homogeneous chewing gum mass and extruding said homogeneous chewing gum mass as a chewing gum slab, said chewing gum slab having a temperature on exit suitable for rolling and scoring in the absence of any additional cooling.

2. The method of claim 1, wherein said plasticizers are selected from the group consisting of glycerin, lanolin, stearic acid, sodium stearate, potassium stearate, glyceral triacetate, hydrogenated vegetable oils and mixtures thereof.

3. The method of claim 2, wherein said texturizer is corn syrup.

4. The method of claim 3, wherein said bulking agents are selected from the group consisting of sugars, sugar alcohols, calcium carbonate and dicalcium phosphates and mixtures thereof.

5. The method of claim 4, wherein said sweeteners are selected from the group consisting of amino acid-based sweeteners, dipeptide sweeteners, glycyrrhizin, saccharin and its salts, acesulfame salts, cyclamates, steviosides, talin, sucralose, dihydrochalcone compounds and mixtures thereof.

6. The method of claim 5, wherein said flavor is selected from the group consisting of flavor oils, spray-dried flavors, flavor resin encapsulations, powdered flavors and mixtures thereof.

7. The method of claim 6, wherein said flavors are selected from the group consisting of spearmint oil, cinnamon oil, oil of wintergreen, (methyl salicylate), peppermint oil, lemon oil, orange oil, grape oil, lime oil, grapefruit oil, apple essence, strawberry essence, cherry essence, pineapple essence, banana oil and mixtures thereof.

8. The method of claim 7, wherein said gum base is selected from the group consisting of styrene-butadiene copolymer, polyisobutylene, isobutylene-isoprene copolymer (butyl rubber), natural rubber (polyisoprene), rubber latex solids, chicle, crown gum, nisparo, rosidinha, jelutong, pendare, perillo, niger gutta, tunu, and mixtures thereof.

9. The method of claim 8, wherein said gum base is heated to a temperature of from about 65° to 95° C. prior to introduction into said extruder.

10. The method of claim 9, wherein said distance separating said introduction of said chewing gum ingredients and said gum base is equal to at least four times the diameter of the extruder barrel.

11. The method of claim 10, wherein said distance separating said introduction of said chewing gum ingredients and said gum base is equal to at least seven times the diameter of the extruder barrel.

12. The method of claim 11, wherein said distance over which said extrusion mixing of said gum base with said chewing gum ingredients is equal to eighteen times the diameter of said extruder barrel.

* * * * *